United States Patent Office 3,562,353
Patented Feb. 9, 1971

3,562,353
ALPHA-AMINO ACID POLYAMIDE-ORGANOSILICON COMPOSITIONS
Sui-Wu Chow, Somerville, and Joseph Sylvan Byck, Old Bridge, N.J., assignors, by mesne assignments, to the United States of America as represented by the Secretary of the Department of Health, Education, and Welfare
No Drawing. Filed June 9, 1969, Ser. No. 831,716
Int. Cl. C08g 20/08, 41/04, 47/10
U.S. Cl. 260—824                                9 Claims

ABSTRACT OF THE DISCLOSURE

This invention relates to alpha-amino acid polyamide-organosilicon compositions characterized by a polymeric segment or block that is comprised of recurring methylene groups and substituted methylene groups linked to each other through amide linkages

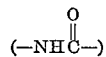

and is chemically bonded to a silicon atom of a siloxane to form block copolymers. The compositions are stable to heat and light and are useful as protective coatings, casting materials, molding materials and elastomers.

---

The invention described herein was made in the course of, or under, a contract with the Department of Health, Education, and Welfare.

This invention relates to alpha-amino acid polyamide-substituted organosilicon compositions characterized by a polyamide polymeric segment or block that is composed of recurring substituted or unsubstituted methylene groups linked to each other through amide linkages

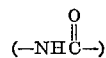

and that is chemically bonded to a silicon atom. αhe valences of silicon in the compositions that are not bonded to such polyamide segments are bonded to such groups as monovalent hydrocarbon groups or oxygen atoms of siloxane linkages.

The polyamide block can be represented by the formula:

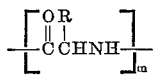

wherein R is a monovalent group as more specifically defined hereafter. The chemical bond or linking group between the polyamide block and the silicon atom can be provided by any suitable divalent atom or group such as shown in the following table:

TABLE 1

| L linking group | |
|---|---|
| ≡Si— —R°NH— | $\left[\begin{array}{c}\text{OR}\\\|\ \|\\ -\text{CCHNH}-\end{array}\right]$ |
| ≡Si— —R°OCOOR°NH— | Same as above. |
| ≡Si— —R°NHOCR°NH— | Do. |
| ≡Si— —OR°NH— | Do. |
| ≡Si— —R°OR°NH— | Do. |
| ≡Si— —R°NHR°NH— | Do. |
| ≡Si— —R°NHR°OCOOR°NH— | Do. |
| ≡Si— —R°NHCOOR°NH— | Do. |
| ≡Si— —R°NHCONHR°NHCOOR°NH— | Do. |
| ≡Si— —R°NHCONHR°NHCONHR°NH— | Dol |
| ≡Si— —R°NHCONHR°NH— | Do. |
| ≡Si— —R°COOR°NH— | Do. |
| ≡Si— —R°COOR°OCOOR°NH— | Do. |
| ≡Si— —R°COOR°NH— | Do. |
| ≡Si— —R°CONHR°NH— | Do. |
| ≡Si— —R°OR°OCOOR°NH | Do. |
| ≡Si— —R°OCONHR°NHCOOR°NH— | Do. |
| ≡Si— —R°OCONHR°NHCONHR°NH— | Do. |
| ≡Si— —R°OCONHR°NH— | Do. |
| ≡Si— —R°OCONHR°NH— | Do. |
| ≡Si— —R°O— | Do. |
| ≡Si— —R°OOCR°NH— | Do. |
| ≡Si— —R°OOCR°CONH— | Do. | wherein the valence on the left is bonded to silicon, the valence on the right is bonded to carbonyl of the polyamide block, L designates the linking group, R° is a divalent hydrocarbon group, ≡Si— represents the silicon of a siloxane block, and

is the polyamide block; and/or as shown in the following table:

TABLE 2

| L' linking group | | |
|---|---|---|
| $\left[\begin{array}{c}\text{OR}\\\|\ \|\\ -\text{CCHNH}-\end{array}\right]$ | —COR°O— | —Si≡ |
| Same as above | —COR°OR°O— | —Si≡ |
| Do. | —R°O— | —Si≡ |
| Do. | —COR°OR°— | —Si≡ |
| Do. | —COR°OR°OR°— | —Si≡ |
| Do. | —R°OR° | —Si≡ |
| Do. | —COR°OCOR°— | —Si≡ |
| Do. | —COR°OR°OCOR°— | —Si≡ |
| Do. | —ROCOR°— | —Si≡ |
| Do. | —COR°OCONHR°— | —Si≡ |
| Do. | —COR°OR°OCONHR° | —Si≡ |
| Do. | —R°OCONHR°— | —Si≡ |
| Do. | —COR°OCOOR°— | —Si≡ |
| Do. | —COR°OR°OCOOR°— | —Si≡ |
| Do. | —R°OCOOR°— | —Si≡ |
| Do. | —CONHR° | —Si≡ |
| Do. | —COOCOR°— | —Si≡ |
| Do. | —COOR°— | —Si≡ | wherein the valence on the left is bonded to nitrogen of the polyamide block and the valence on the right is bonded to silicon of a siloxane block and the symbols are as described in Table 1.

The novel compositions can be characterized by one or more types of linking groups shown in Table 1 only or one or more types shown in Table 2 only, in which case the polyamide block is bonded at only one end to silicon, or they can be characterized by linking groups from both Tables 1 and 2, in which case both ends of the polyamide block are bonded to silicon atoms. As an example in the first case, when the silicon-containing portion is difunctional, the novel composition is of the ABA type where A designates the polyamide block and B designates the silicon-containing portion. As an example in the second case, when the silicon-containing portion is difunctional, the novel composition is of the $(AB)_n$ type where A and B designate the polyamide block and the silicon-containing portion and $n$ is an integer of 1 or more.

The silicon-containing portion can be a siloxane, characterized by one or more of the well known fundamental grouping —SiO—Si—, in which one or a plurality of the valences of the silicon atoms is linked to polyamide blocks.

A preferred class of the compositions of the invention are block copolymers comprising from 1 to 99 mole percent of polyamide blocks having the formula:

  (1)

wherein R is a hydrogen atom or a monovalent organic group as more specifically defined hereinafter, $m$ is a positive number and from 1 to 99 mole percent of siloxane blocks comprising at least two units having the formula:

  (2)

wherein Z is a monovalent hydrocarbon group or a divalent linking group L or L' as defined above, each siloxane block having at least one such divalent linking group represented by Z, and $b$ has a value from 2 to 3 inclusive.

An especially preferred class of the compositions of this invention are thermoplastic block copolymers comprising (A) from 5 to 95 mole percent of at least two alpha-amino acid polyamide blocks having the Formula 1, each polyamide block having a molecular weight from 2,000 to 100,000 and (B) from 5 to 95 mole percent of at least one siloxane block represented by the formula:

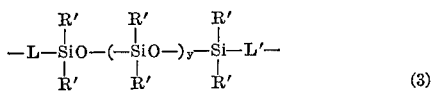  (3)

wherein R' is a monovalent hydrocarbon group, L and L' are defined above, and $y$ is a positive number, each siloxane block having an average molecular weight of from 500 to 100,000.

The above-described especially preferred thermoplastic block copolymers of this invention can be elastomeric or rigid. The thermoplastic and elastomeric block copolymers preferably have a tensile modulus from 100 to 10,000 and higher pounds per square inch, a polyamide block content from 5 to 50 mole percent and a siloxane block content from 50 to 95 mole percent. The thermoplastic and rigid block copolymers preferably have a tensile modulus from 15,000 to 150,000 and higher pounds per square inch, a polyamide block content from 10 to 95 mole percent and a siloxane block content from 5 to 90 mole percent. Such thermoplastic and elastomeric or rigid block copolymers are elastomeric or rigid without being crosslinked.

Illustrative of the monovalent hydrocarbon groups that are represented by R' in Formula 3, and other formulas herein, Z in Formula 2 are the alkyl groups (for example, the methyl, ethyl, n-propyl, isopropyl, n-butyl, sec-butyl, isobutyl, t-butyl, n-octyl, decyl, dodecyl groups), the cycloalkyl groups (for example, the cyclopropyl, cyclobutyl, cyclopentyl, cyclohexyl, cycloheptyl groups), the alkenyl groups (for example, the vinyl, allyl, crotyl, 3-butenyl, 1,3-butadiene, allenyl groups), the cycloalkenyl groups (for example, the cyclopentenyl, cyclohexenyl groups), the alkynyl groups (for example, the ethynyl, propargyl groups), the aryl groups (for example, the phenyl, naphthyl, phenathrenyl, anthracenyl groups), the aralkyl groups (for example, the benzyl, 2-phenylethyl, 2-phenylpropyl, cumyl groups), the alkaryl groups (for example, the tolyl, b-butylphenyl, styryl, cyclohexylphenyl groups).

Illustrative of the divalent hydrocarbon groups represented by R° in formulas above and elsewhere herein are the alkylene groups (e.g., the methylene, ethylene, propylene, and butylene groups), the arylene groups (e.g., the ortho, meta and para phenylene groups) and the alkenylene groups (e.g., the —CH=CH—, —CH$_2$CH=CHCH$_2$— and —CH$_2$CH$_2$CH=CHCH$_2$— groups).

In the above formulas, the symbols representing the numbers and types of groups need not have the same meaning at each occurrence throughout the composition. For example, in a given block copolymer having groups represented by Formula 2 above, some of such groups can be a dimethylsiloxane group while other of such groups can be methylphenylsiloxane groups and/or diphenylsiloxane groups.

As described in more detail hereinafter the novel compositions are prepared by reacting an alpha-amino acid polyamide having reactive end groups, such as, ≡COH, ≡CNH$_2$, ≡CNCO, ≡COCOCl, ≡CCH=CH$_2$ and the like with a silicon compound having silicon-bonded groups reactive with such end groups, e.g., Me$_2$NSi≡, ClR°Si≡, HOOCR°Si≡, OCNR°Si≡, HOR°Si≡, H$_2$NR°Si≡

ClOCR°Si≡ and the like.

In such reactions, the nature of these reactive groups determines the structure of the linking group represented by L and L' in Formula 3 and Z in Formula 2. These reactions can be illustrated by the following equations:

(a)  ≡COH+Me$_2$NSi≡→ ≡C—O—Si≡ +Me$_2$NH (b)  ≡COH+ClSi≡→ ≡C—O—Si≡ +HCl (c)  ≡COH+OCN(CH$_2$)$_3$Si≡→
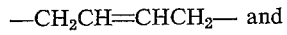
≡COOCNH(CH$_2$)$_2$Si≡

(d)  ≡COOCNHC$_6$H$_4$NCO+H$_2$N(CH$_2$)$_3$Si≡→
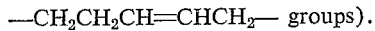
≡COOCNHC$_6$H$_4$NH—CONH(CH$_2$)$_3$Si≡

(e)  ≡COCOCl+H$_2$N(CH$_2$)$_3$Si≡→
≡COOCNH(CH$_2$)$_3$Si≡ +HCl (f)  ≡COH+ClOC(CH$_2$)$_2$Si≡→
≡COOC(CH$_2$)$_2$+Si≡HCl (g)  ≡COH+Br(CH$_2$)$_4$Si≡→ ≡CO(CH$_2$)$_4$Si≡ +HBr (h)  ≡COOCOCH$_2$CH=CH$_2$+HSi≡→
≡COOCOCH$_2$CH$_2$CH$_2$Si≡
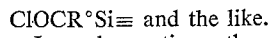

(i)  ≡COH+HOOCR°Si≡→ ≡COOCR°Si≡

(j)  ≡COH+ClOCR°Si≡→ ≡COOCR°Si≡

(k)  ≡COCOCl+HOR°Si≡→ ≡COCOOR°Si≡

(l)  ≡COH+CH$_2$=CHSi≡→ ≡COC$_2$H$_4$Si≡

(m)  ≡CNCO+HSi≡→ ≡CNHCOSi≡

(o)  ≡CNCO+HOOCR°Si≡→ ≡CNHCOOCOR°Si≡

(p)  ≡CNCO+HOR°Si≡→ ≡CNHCOOR°Si≡

(r)  ≡COCOCl+HOOCR°Si≡→ ≡COCOOCOR°Si≡

(s)  ≡COCOCl+HOR°Si≡→ ≡COCOOR°Si≡

(u) $\equiv CNH_2 + ClR°Si\equiv \rightarrow \equiv CNHR°Si\equiv$ (w) $\equiv CNH_2 + HOOCR°Si\equiv \rightarrow \equiv CNHOCR°Si\equiv$ (x) $\equiv CNH_2 + OCNR°Si\equiv \rightarrow \equiv CNHOCNHR°Si\equiv$ (y) $\equiv CNH_2 + ClOCR°Si\equiv \rightarrow \equiv CNHOCR°Si\equiv$ (aa) $\equiv CCOOH + HOR°Si\equiv \rightarrow \equiv CCOOR°Si\equiv$ (bb) $\equiv CCOOH + H_2NR°Si\equiv \rightarrow \equiv CCONHR°Si\equiv$ (cc) $\equiv CCOOH + OCNR°Si\equiv \rightarrow \equiv CCOOCONHR°Si\equiv$ precise control of the reaction stoichiometry. This process has proven superior to other processes because the reaction is rapid and facile, the only by-product is an easily removed, non-corrosive gas and the starting materials are easily prepared.

The following equation more specifically illustrates the reaction of Equation a above the case where a particular alpha-amino acid polyamide-siloxane block copolymer of this invention is produced:

(dd)
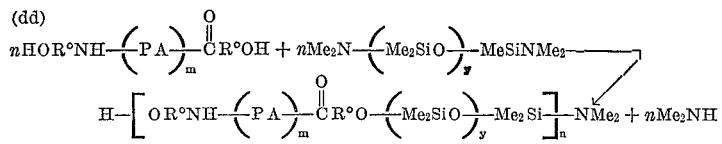

In Equations a through c, f, g, i, j, l, $\equiv COH$ represents a carbinol group of the terminal group in the polyamide. In Equations u, w, x and y, $\equiv CNH_2$ represents an amino group of the terminal group of the polyamide. In Equations d, m, o and p, $\equiv CNCO$ represents an isocyanato group of the terminal group of the polyamide derived by reaction of the above-mentioned polyamide having $\equiv CNH_2$ end groups with phosgene. In Equations e, k and s, $\equiv COCOCl$ represents a carbonyl carbonyl chloride group of the terminal group of the polyamide derived by reaction of the above-mentioned polyamide having $\equiv COH$ end groups with phosgene. In Equations h and v, an olefinically unsaturated end group of the polyamide is shown on the far left. In Equations aa, bb and cc, $\equiv CCOOH$ represents a carboxy group of the terminal group of the polyamide. In general, the known reaction conditions for effecting the reaction between the reactive group of Equations a through cc can be used when polyamide and siloxane reactants containing such reactive groups are employed in producing the compositions of this invention.

With particular reference to Equation a, above, it should be noted that this equation illustrates a process for producing a block copolymer of this invention wherein the siloxane and polyamide blocks are linked by, for example, a linking group L having the formula $$-OR°NH-$$

and a linking group L', having the formula $-COR°O-$ or $-R°O-$. Thus, the process of Equation a in this illustration comprises reacting a polyamide of the formula:

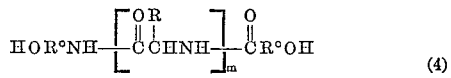
(4)

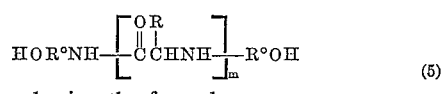
(5)

with a siloxane having the formula:

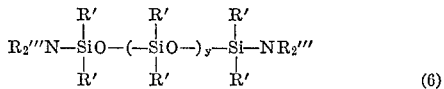
(6)

wherein R, R°, R', m and y are as defined above and R''' is hydrogen or monovalent hydrocarbon as illustrated above for R'.

The reaction produces the block copolymer and ammonia or an amine which are separated (e.g., by volatilizing the amine). The process can be conducted at a temperature of, for example 50 to 200° C. in a solvent such as trichlorobenzene, dichlorobenzene or monochlorobenzene. The block copolymer can be separated from the solvent by adding a non-solvent such as methanol. The production of a block copolymer having the desired reduced viscosity is assured by exercising wherein n, m and y are integers as defined above R° is defined above and PA designates the recurring polyamide units of the formula:

(7)

Equation dd above illustrates the preparation of an $(A-B)_n$ block copolymer from one mole of alpha-amino acid polymer and one mole of bis-(dimethyl amino)-polydimethylsiloxane. The use of two moles of alpha-amino acid polymer and one mole of bis-(dimethyl amino)-polydimethylsiloxane gives an A–B–A block copolymer of the following structure:

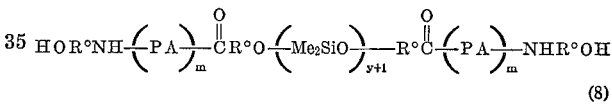
(8)

The alpha-amino acid polymer employed in producing the novel compositions is prepared by any suitable procedure, for example, by (1) forming the N-carboxy anhydride (NCA) of the alpha-amino acid and (2) polymerizing the NCA using a primary amino initiator, e.g., $DNH_2$, to form a polymer of the formula

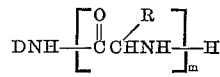

wherein R and m are as described above and DNH is a monovalent organic terminal group, such as $OCNR°NH-$ $OCNR°NHCOOR°NH-$ $HOR°NH-$ $H_2NR°NH-$

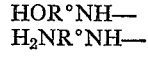

$OCNR°NHCONHR°NH-$ or a monovalent siloxanyl hydrocarbon imino group

wherein R', R° and y are as described above. If desired, the resulting alpha-amino acid polymer can be capped or further modified by reaction with a compound reactive with the terminal $-NH_2$ group or the terminal D group (if it contains a reactive group), of the polymer to provide a non-reactive end group or wide variety of reactive end groups.

The polymerization is conducted with an initiator which can be a primary mono-amine or a primary diamine, $DNH_2$ or $H_2ND'NH_2$, wherein D is as described above and D' is a diavalent hydrocarbon group having 1 to 18 carbon atoms including alkylene having 1 to 18, preferably 1 to 6, carbon atoms, cycloalkylene having 5 to 8 carbon atoms in the ring, and arylene having 6 to 18, preferably 6 to 12, carbon atoms; or a divalent siloxanyl hydrocarbon group

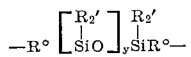

wherein R′, R° and y are as defined above.

The polymerization is preferably carried out in a solvent such as dimethylformamide or dioxane and can be depicted by the equations:

(ee)

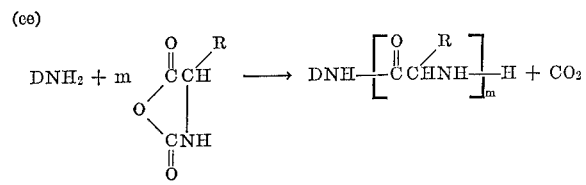

(ff)

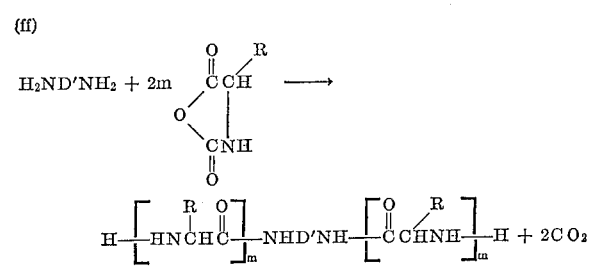

Procedures for preparing alpha-amino acid polymers are well known. Such procedures are described in Hanby, W. E., S. G. Waley, and J. Watson, J. Chem. Soc., 3230 (1950); Blout, E. R., R. H. Karlson, P. Doty, and B. Hargitay, J. Am. Chem. Soc., 76, 4493 (1954); Doty, P., A. M. Holtzer, J. H. Bradbury, and E. R. Blout, J. Am. Chem Soc. 76, 4493 (1954); Blout, E. R. and R. H. Karlson, J. Am. Chem. Soc., 78, 941 (1956); Doty, C., J. H. Bradbury, and A. M. Holtzer, J. Am. Chem. Soc., 78, 947 (1956); and Blout, E. R. and A. Asadourian, J. Am. Chem. Soc., 78, 955 (1956).

The NCA is advantageously prepared by the procedures described in Blout and Karlson, supra, by the reaction of phosgene with the alpha-amino acid in a suitable solvent such as dioxane, as shown in the following equation:

(gg)

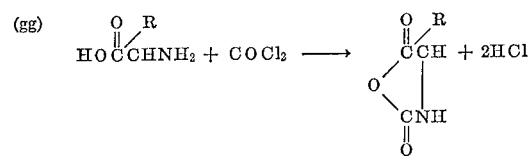

In the case in which the alpha-amino acid is a dicarboxylic acid, e.g., glutamic acid, aspartic acid, gamma-methylene glutamic acid, lanthionine, cystine or djenkolic acid, it is preferable to esterify or otherwise render unreactive the carboxy group which is not bonded to the carbon atom to which the amino group is bonded. This is readily accomplished by reacting the alpha-amino acid with a suitable alcohol, e.g., benzyl alcohol (for example, in the presence of 48% hydrobromic acid and an excess benzyl alcohol as solvent), in the manner described in Blout and Karlson, supra, to form the gamma benzyl ester in the case of glutamic acid, for example.

Also, when the alpha-amino acid is a dicarboxylic acid such as those set forth above, there is a tendency, with the passage of time from the terminal primary amino group to react with the ester or carboxyl moiety, e.g., the benzyl ester moiety. This results in cyclization to form a lactam ring with ejection of the ester moiety in the manner shown by the following equation:

(hh)

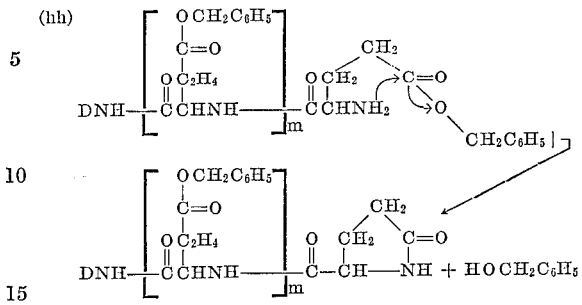

wherein the variables are as previously defined. The cyclic end group is essentially non-reactive with a reactive group of the silicon compound and it would not be possible to form $(AB)_n$ copolymers. Of course, if the other end group D contained no group reactive with a reactive group of the silicon compound, no alpha-amino acid polyamide-organosilicon composition would be obtainable.

Cyclization of the terminal primary amino group can be averted by the addition, especially during the final stages of the polymerization, e.g., at about 80% completion, or directly after the polymerization, of the NCA of a "neutral" alpha-amino acid, i.e., one containing no group, such as an ester or carboxyl group, able to be displaced by the terminal primary amino group. Such "neutral" alpha-amino acids include phenylalanine, glycine, valine, leucine, isoleucine, alpha-aminobutyric acid, and the like. The "neutral" alpha-amino acid is preferably used in excess molar amounts relative to the initiator, e.g., 1.1 to 2 or 3 moles of the "neutral" alpha-amino acid per mole of initiator. The reaction, using phenylalanine as an example, can be represented by the following equation:

(ii)

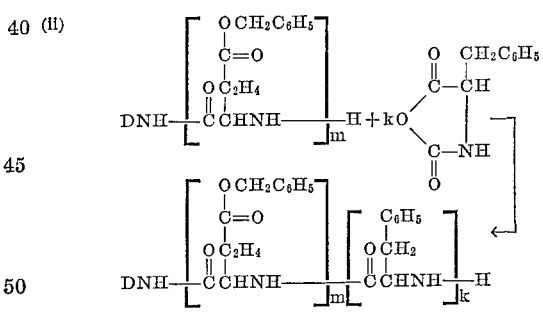

wherein $k$ is an integer representing the molar amount of phenylalanine per mole of initiator and the other variables are as previously defined.

The alpha-amino acids which can be used to prepare the oligomers or polymers of alpha-amino acids, hereinafter called the polyamide, include the well known alpha-amino acids and can be represented by the formula:

(10)

wherein R is a monovalent group selected from the class consisting of (1) hydrogen, as in glycine; and a monovalent organic group including (2) alkyl having 1 to 18 carbon atoms, preferably lower alkyl having 1 to 6 carbon atoms, for example, methyl as in alanine, ethyl as in alpha-aminobutyric acid, isopropyl as in valine, isobutyl as in leucine, sec-butyl as in isoleucine, n-butyl as in norleucine, and the like; (3) aralkyl having 7 to 18, preferably 7 to 12, carbon atoms, such as, benzyl as in phenylalanine and the like (4) hydroxy-substituted aralkyl having 7 to 18, preferably 7 to 12, carbon atoms, such as, para-hydroxybenzyl as in tyrosine and the like; (5) hydroxy-alkyl having 1 to 18, preferably 1 to 6, carbon atoms, such as, hydroxymethyl as in serine, 1-hydroxyethyl as in threonine and the like; (6) carboxyalkyl having 2 to 18, preferably 2 to 7, carbon atoms, such as carboxymethyl as in aspartic acid, 2-carboxyethyl as in glutamic acid and the like; (7) aminoalkyl having 1 to 18, preferably 1 to 6, carbon atoms, such as, 4-aminobutyl as in lysine, 2-aminoethyl as in alpha,gamma-diaminobutyric acid, 3-aminopropyl as in ornithine; (8) hydroxyaminoalkyl having 1 to 18, preferably 1 to 6, carbon atoms, such as, 4-amino-3-hydroxybutyl as in hydroxylysine, and the like; (9) carboxyaminoalkyl having 2 to 18, preferably 2 to 7, carbon atoms, such as, 4-carboxy-4-aminobutyl as in alpha,epsilon-diaminopimelic acid, and the like; (10) methylenecarboxyalkyl having 3 to 18, preferably 3 to 9 carbon atoms, such as, 2-methylene-2-carboxyethyl as in gamma-methyleneglutamic acid, and the like; (11) mercaptoalkyl having 1 to 18, preferably 1 to 6, carbon atoms, such as, mercaptomethyl as in cysteine, 1-mercaptoisopropyl as in beta-thiolvalvine, and the like; (12) alkylthioalkyl having 1 to 18, preferably 1 to 6, carbon atoms in each alkyl moiety, such as, 2-methylthioethyl as in methionine, and the like; (13) carboxyaminoalkylthioalkyl having 1 to 18, preferably 1 to 6, carbon atoms, in each alkyl moiety, such as, 2-carboxy-2-aminoethylthiomethyl as in lanthionine and the like; (14) carboxyaminoalkyldithioalkyl having 1 to 18, preferably 1 to 6, carbon atoms in each alkyl moiety, such as cystine and the like; (15) carboxyaminoalkylthioalkylthioalkyl having 1 to 18, preferably 1 to 6, carbon atoms in each alkyl moiety, such as, djenkolic acid and the like; (16) carbamylalkyl having 1 to 18, preferably 1 to 6, carbon atoms, such as, carbamylmethyl as in asparagine, 2-carbamylethyl as in glutamine and the like; (17) guanidinoalkyl having 1 to 18, preferably 1 to 6, carbon atoms in the alkyl moiety, such as, 3-guanidinopropyl as in arginine and the like; (18) guanidinoxyalkyl having 1 to 18, preferably 1 to 6, carbon atoms in the alkyl moiety, such as, 2-guanidinoxyethyl as in canavanine and the like; (19) ureidoalkyl having 1 to 18, preferably 1 to 6, carbon atoms in the alkyl moiety, such as 3-ureidoethyl as in citrulline and the like; (20) 3-indolylalkyl having 1 to 18, preferably 1 to 6, carbon atoms in the alkyl moiety, such as 3-indolylmethyl as in tryptophan and the like; (21) 1,4-diazolyl-2-alkyl having 1 to 18, preferably 1 to 6, carbon atoms in the alkyl moiety, such as, 1,4-diazolyl-2-methyl as in histidine and the like; (22) hydroxyhaloaralkyl having 7 to 18, preferably 7 to 12, carbon atoms, such as, para-hydroxy-meta,meta-diiodobenzyl as in diiodotyrosine and the like; (23) hydroxyhaloaryloxyaralkyl having 13 to 18 carbon atoms, such as, para-(para-hydroxy-meta,meta-diiodophenoxy)-meta,meta-diiodophenylmethyl as in thyroxine and the like; and, when taken with one nitrogen-bonded hydrogen shown in Formula 10, R is a divalent organic group selected from the class consisting of (24) alkylene having 1 to 18, preferably 1 to 6, carbon atoms, such as, 1,3-propylene as in proline and the like; and (25) hydroxyalkylene having 1 to 18, preferably 1 to 6, carbon atoms, such as, 2-hydroxy-1,3-propylene as in hydroxyproline and the like.

When using those alpha-amino acids which contain additional amino groups in other than the alpha position as in the R groups identified above as numbers (7), (8), (9), (13), (14), (15), (16), (17), (18) and (19); those amino acids which contain a hydroxyl group other than as a part numbers (4), (5), (8), (22), (23) and (25); and for those amino acids having a mercapto group as in the R group above identified by (11), it is preferable to protect such amino, hydroxyl and mercapto groups by blocking them with a group which can be readily removed as by subsequent hydrogenation to regenerate the original amino, hydroxyl and mercapto group after formation of the block copolymer or after formation of the alpha-amino acid polymer. This can be readily achieved by the reaction of such groups in the amino-acid with benzochloroformate as illustrated in the following equation:

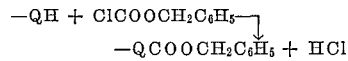

wherein Q is the divalent atom or group —NH—, —O—, or —S—. R as defined above includes such protected forms.

One class of initiators than can be used in the production of the polyamides is the amino alkanols and phenols which can be represented by the formula:

$$HOR°NH_2 \quad (11)$$

wherein R° is a divalent hydrocarbon such as alkylene having 1 to 18, preferably 2 to 6, carbon atoms, cycloalkylene having 5 to 8 carbon atoms, and arylene having 6 to 18, preferably 6 to 12, carbon atoms. Examples of such initiators include 2-aminoethanol, 2-amino-1-butanol, 2-amino-2-methyl-1-propanol, and the like, 4-aminocyclohexanol, 3-aminocyclopentanol, and the like, and ortho-, meta- and para-aminophenol, 2- and 3-amino-p-cresol, 6-amino-m-cresol, 3-, 4- and 5-amino-o-cresol, tyramine, o-, m- and p-anilinophenol, 1-, 3-, 5-, 6-, 7- and 8-amino-2-naphthol, 2-, 4-, 5-, 7- and 8-amino-1-naphthol and the like.

Another class of initiators is the olefinic hydrocarbon amines having 2 to 18, preferably 2 to 8, carbon atoms, such as, the alkenyl amines including vinyl amine, allyl amine, 5-amino-4-methyl-1-hexene and the like and cycloalkenyl amines including beta-camphyl amine, cyclohexene amine and the like. Alpha-amino acid polyamides made with olefinically unsaturated hydrocarbon amine initiators of these types contain olefinically unsaturated groups at one end which can be reacted with silicon-bonded hydrogen of the siloxane as described above to form the novel compositions.

Another type of initiator is the amino acids such as the alpha-amino acids listed above and beta-alanine, gamma-aminobutyric acid, and the like.

Still another class of initiators is the diamines of the formula $H_2N(R°NH)_rH$ wherein R° is as defined above and $r$ is an integer of 1 to 6. When a diamine is used as the initiator the alpha-amino acid polymer grows from both of the primary amine groups and there results a polymer of the formula:

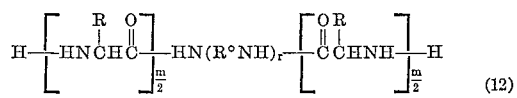

wherein the variables are as defined above. Such polymers have the same reactive group on both ends which can be used as is in further reaction with the silicon compound or can be converted to like pairs of other reactive groups as desired.

When it is desired to produce a polymer having just one reactive primary amino group, the initiator employed can be a mono primary amine having the formula: $R'NH_2$. Such polymers are useful in producing compositions of the ABA type.

Another class of initiators is siloxanes having, bonded to silicon, one or more primary aminohydrocarbyl group, $H_2NR°—$; or one or more aminohydrocarbyloxy group, $H_2NR°O—$. Representative siloxanes of this type can be depicted by the formulas:

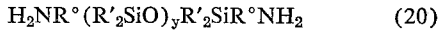

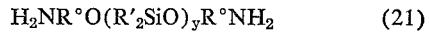

wherein the variables are as defined above.

Typical primary aminohydrocarbyl groups are the aminoalkyl groups including aminomethyl, aminopropyl, aminobutyl, aminohexyl and the like; aminocycloalkyl groups including aminocyclohexyl, aminocyclopentyl and the like; and aminoaryl groups including aminophenyl, aminonaphthyl and the like. Typical primary aminohydrocarbyloxy groups are the aminoalkoxy groups including aminoethoxy, aminobutoxy, aminohexoxy and the like; aminocycloalkoxy including aminocyclohexoxy, aminocyclopentoxy and the like; and aminoaryloxy groups including aminophenoxy, aminonaphthyloxy and the like. In this instance the novel alpha-amino acid polyamide-silicon compositions are formed without the need for further reaction with a silicon compound, although such further reaction can be carried out if desired.

When a polymer of the monoesterified dicarboxylic acid, e.g., glutamic acid, etc., as explained above, has been prepared, it may be desirable to convert some or all of the monoester groups back to the carboxyl form. This is conveniently accomplished before the end capping or end group modifying operation. Any suitable procedure can be used which does not result in excessive degradation and we have found it advantageous to hydrogenate such polymers in acetic acid using an excess of phosphonium iodide while passing a continuous stream of hydrogen through the reaction mixture. This hydrogenation can be depicted by the representative reaction equation using the benzyl ester as an example:

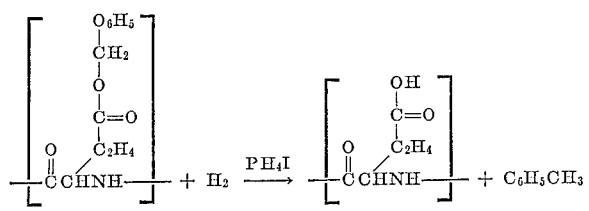

Capping compounds which can be reacted with the amino terminal group of the alpha-amino acid polymer include the lactones or cyclic esters, the hydroxy carboxylic acids and the 1,2-epoxides.

The lactones or cyclic esters can be represented by the formula:

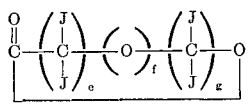

wherein each J, individually, is selected from the class consisting of hydrogen, alkyl having 1 to 18, preferably 1 to 6, carbon atoms, halo and alkoxy having 1 to 18, preferably 1 to 6, carbon atoms, $e$ is an integer of 1 to 4, $g$ is an integer of 1 to 4; $f$ is an integer of 0 to 1; the sum of $e+g$ is 2 to 7, and no more than three of the J substituents are other than hydrogen. Examples of suitable lactones or cyclic esters include beta-propiolactone, gamma-butyrolactone, delta-valerolactone; epsilon-caprolactone; zeta-enantholactone; eta-caprylolactone; the monoalkyl-delta-valerolactones, e.g., the monomethyl-, monoethyl-, monohexyl-, data-valerolactones, and the like; the dialkyl-delta-valerolactones, e.g., the dimethyl-, diethyl-, and di-n-octyl-data-valerolactones, and the like; the monoalkyl-, dialkyl-, and trialkyl-epsilon-caprolactones, e.g., the monomethyl-, monoethyl-, monohexyl-, dimethyl-, diethyl-, di-n-propyl-, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., the monomethoxy-, monoisopropoxy, dimethoxy, and diethoxy-delta-valerolactones and epsilon-caprolactones, and the like, 1,4-dioxane-2-one; dimethyl-1,4-dioxane-2-one, and the like.

End capping with a lactone can be portrayed by the equation:

(jj)
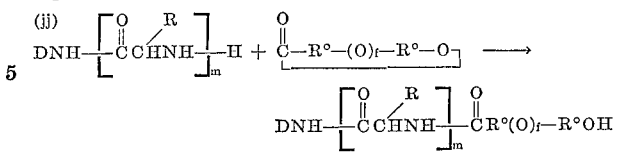

wherein the variables are as defined above and for simplicity

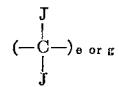

is depicted as R°.

The hydroxy carboxylic acids can be represented by the formula:

$$HOOCR°OH$$

wherein R° is a divalent hydrocarbon, group having no more than 18, preferably no more than 12, carbon atoms, such as alkylene having 1 to 18, preferably 1 to 6, carbon atoms, cycloalkylene having 5 to 18, preferably 5 to 8, carbon atoms, and arylene having 6 to 18, preferably 6 to 12, carbon atoms. Suitable hydroxy carboxylic acids include glycolic acid, lactic acid, gamma-butyric acid, 2-hydroxy-cyclohexane carboxylic acid, p-hydroxybenzoic acid, p-(alpha-hydroxybenzyl) benzoic acid and the like.

End capping with a hydroxy carboxylic acid can be portrayed by the equation:

(kk)

wherein the variables are as defined above.

The 1,2-epoxides can be represented by the formula:

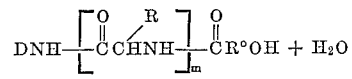

wherein each G, individually, is selected from the class consisting of hydrogen and monovalent hydrocarbon such as alkyl having 1 to 18, preferably 1 to 8, carbon atoms including methyl, ethyl, butyl, hexyl, octyl, benzyl and the like, cycloalkyl having 3 to 18, preferably 5 to 10, carbon atoms including cyclopropyl, cyclopentyl, cyclohexyl and the like, and aryl having 6 to 18, preferably 6 to 12, carbon atoms including phenyl, tolyl, xylyl, naphthyl and the like; and wherein both G radicals taken together with the vicinal carbon atoms of the epoxide ring are alkylene having 3 to 5, preferably 3 to 4, carbon atoms in its chain including 1,3-propylene, 1,4-butylene and the like. Specific epoxides include ethylene oxide, propylene oxide, 1,2-hexene oxide, styrene oxide, vinyl cyclohexene oxide, cyclopentene oxide, cyclohexene oxide, cyclooctene oxide and the like.

End capping with a 1,2-epoxide can be portrayed by the equation:

(ll)
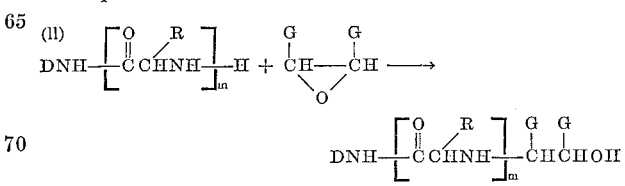

wherein the variables are as defined above.

Alpha-amino acid polymers having hydroxyl end groups can be further modified by reaction with phosgene to convert such hydroxyl end groups to the oxycarbonyl chloride group as depicted by the representative equations:

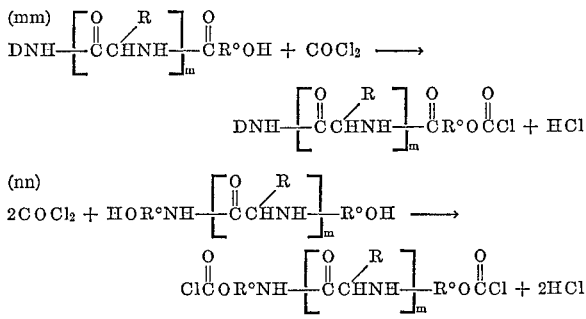

(mm) $DNH{-}[\overset{O}{\overset{\|}{C}}\overset{R}{\overset{/}{C}}HNH]_m{-}\overset{O}{\overset{\|}{C}}R°OH + COCl_2 \longrightarrow$ $DNH{-}[\overset{O}{\overset{\|}{C}}\overset{R}{\overset{/}{C}}HNH]_m{-}\overset{O}{\overset{\|}{C}}R°O\overset{O}{\overset{\|}{C}}Cl + HCl$ (nn) $2COCl_2 + HOR°NH{-}[\overset{O}{\overset{\|}{C}}\overset{R}{\overset{/}{C}}HNH]_m{-}R°OH \longrightarrow$ $Cl\overset{O}{\overset{\|}{C}}OR°NH{-}[\overset{O}{\overset{\|}{C}}\overset{R}{\overset{/}{C}}HNH]_m{-}R°O\overset{O}{\overset{\|}{C}}Cl + 2HCl$ wherein the variables are as defined above.

Alpha-amino acid polymers having primary amino end groups can be modified by reaction with phosgene to convert the amino end groups into isocyanato groups as depicted by the following representative equations:

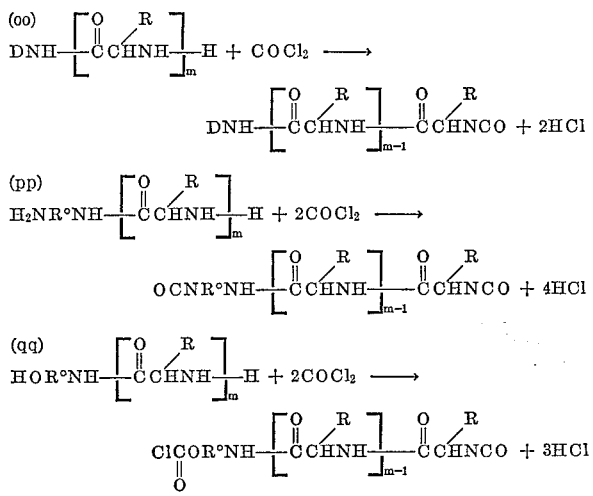

(oo) $DNH{-}[\overset{O}{\overset{\|}{C}}\overset{R}{\overset{/}{C}}HNH]_m{-}H + COCl_2 \longrightarrow$ $DNH{-}[\overset{O}{\overset{\|}{C}}\overset{R}{\overset{/}{C}}HNH]_{m-1}{-}\overset{O}{\overset{\|}{C}}\overset{R}{\overset{/}{C}}HNCO + 2HCl$ (pp) $H_2NR°NH{-}[\overset{O}{\overset{\|}{C}}\overset{R}{\overset{/}{C}}HNH]_m{-}H + 2COCl_2 \longrightarrow$ $OCNR°NH{-}[\overset{O}{\overset{\|}{C}}\overset{R}{\overset{/}{C}}HNH]_{m-1}{-}\overset{O}{\overset{\|}{C}}\overset{R}{\overset{/}{C}}HNCO + 4HCl$ (qq) $HOR°NH{-}[\overset{O}{\overset{\|}{C}}\overset{R}{\overset{/}{C}}HNH]_m{-}H + 2COCl_2 \longrightarrow$ $ClCOR°NH{-}[\overset{O}{\overset{\|}{C}}\overset{R}{\overset{/}{C}}HNH]_{m-1}{-}\overset{O}{\overset{\|}{C}}\overset{R}{\overset{/}{C}}HNCO + 3HCl$
$\overset{\|}{O}$ wherein the variables are as defined above.

Alpha-amino acid polymers having hydroxyl end groups and/or carboxyl end groups can be modified by reaction with diisocyanates, such as, 2,6-tolylene diisocyanate, bis(4-isocyanatophenyl)methane, polyphenylmethylene polyisocyanates, produced by phosgenation of aniline-formaldehyde condensation products, bis(2-isocyanatoethyl)fumarate, bis(2-isocyanatoethyl) carbonate and many others, to convert the hydroxyl or carboxyl end groups into isocyanato containing urethane end groups as portrayed by the following representative equations:

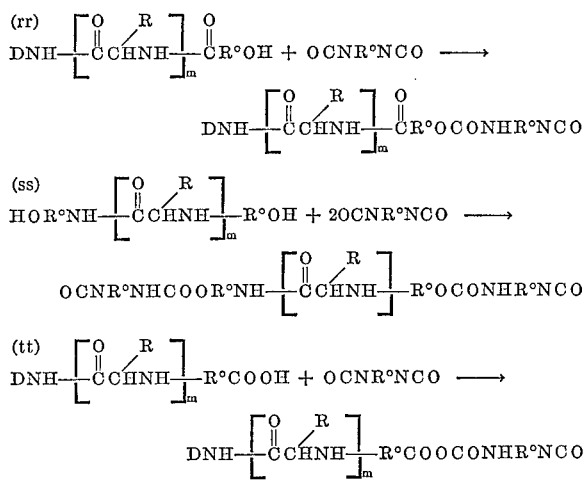

(rr) $DNH{-}[\overset{O}{\overset{\|}{C}}\overset{R}{\overset{/}{C}}HNH]_m{-}\overset{O}{\overset{\|}{C}}R°OH + OCNR°NCO \longrightarrow$ $DNH{-}[\overset{O}{\overset{\|}{C}}\overset{R}{\overset{/}{C}}HNH]_m{-}\overset{O}{\overset{\|}{C}}R°OCONHR°NCO$ (ss) $HOR°NH{-}[\overset{O}{\overset{\|}{C}}\overset{R}{\overset{/}{C}}HNH]_m{-}R°OH + 2OCNR°NCO \longrightarrow$ $OCNR°NHCOOR°NH{-}[\overset{O}{\overset{\|}{C}}\overset{R}{\overset{/}{C}}HNH]_m{-}R°OCONHR°NCO$ (tt) $DNH{-}[\overset{O}{\overset{\|}{C}}\overset{R}{\overset{/}{C}}HNH]_m{-}R°COOH + OCNR°NCO \longrightarrow$ $DNH{-}[\overset{O}{\overset{\|}{C}}\overset{R}{\overset{/}{C}}HNH]_m{-}R°COOCONHR°NCO$ Other modifications of the hydroxyl, amino and carboxyl end groups can be made as desired.

The siloxane reactants used to produce the compositions of this invention are well known materials that can be produced by conventional methods.

The conditions used for polymerizing the NCA of alpha-amino acids with the initiator are not narrowly critical. The amount of initiator relative to the amount of NCA monomer is used to control the molecular weight of the resulting polymer in a similar manner in which the initator monomer ratio is used to control molecule weight of polymers in well known addition polymerizations using initiators, e.g., in the production of polyoxyalkylenes. The monomer to initiator ratio on a molar basis can vary from about 5 to about 200 moles, preferably about 10 to about 100 moles of monomer per mole of initiator.

The NCA monomer used can comprise the NCA of only one alpha-amino acid or a mixture of NCA's of two or more different alpha-amino acids such that the polymer chain can consist of only one type of unit of Formula 3 or two or more different types of such units.

Any suitable solvent for the initiator and NCA monomer and the resulting polymer can be used. For example, dioxane, dimethylformamide, nitrobenzene, o-dichlorobenzene, chlorobenzene and the like.

Temperature is not critical and the polymerization is conveniently carried out at room temperature or in the range of about 15° C. to about 200° C., preferably about 20 to about 40° C. Reaction time is governed by the desired molecular weight and temperature used but can extend from about 1 hour to about 3 days, preferably from about 4 hours to about 24 hours. Alpha-amino acid polymers suitable for copolymerization or reaction with the silicon-containing compound can vary widely in average molecular weight, for example, 2,000 to 200,000, preferably about 5,000 to about 100,000 as measured by primary amino end group analysis.

Anhydrous dioxane and dimethylformamide are ideal solvents for the polymerization of gamma-benzyl L-glutamate N-carboxy anhydride since they dissolve the monomer, initiator and the polymer. It has been reported that room temperature polymerization in dioxane using secondary or tertiary amines or strong bases (e.g., hydroxide, sodium methoxide) proceeds relatively rapidly to yield high molecular weight polymer (M.W.=100,000–500,000), while lower molecular weights can be obtained by primary amine initiation. We have prepared high molecular weight poly(gamma-benzyl L-glutamate) by initiation with sodium methoxide at monomer to initiator ratios (M/I) of 500/1 and 100/1 and with triethylamine at M/I=100/1. Using periodic analysis of aliquots of the reaction mixture for unreacted N-carboxy anhydride, it was found that the polymerization could be routinely carried out to greater than 95% conversion. The resulting polymers were characterized by high molecular weight and high alpha-helical content anticipated for such a polymerization. Intrinsic viscosity measurements in dichloroacetic acid solution were used to determine the average molecular weight of the polymers. Dichloroacetic acid was used as solvent in these measurements because it is a solvent in which poly(gamma-benzyl L-glutamate) exists entirely in the random coil configuration. By substituting in the Mark-Houwink equation the empirical constants.

Intrinsic Viscosity=$KM^a$ (M=Molecular Weight) determined by Doty, Bradbury, and Holtze, supra ($K=2.78\times10^{-5}$; $a=0.87$), it was found that initiation at M/I=100 yielded an alpha-amino acid polymer having an average molecular weight of about 110,000. In a similar fashion, it was found that for M/I=500, average molecular weight equaled about 230,000.

The process conditions used for end capping with lactones, hydroxy carboxylic acids or 1,2-epoxides are not narrowly critical. The amounts of end capper and alpha-amino acid polymer can be varied, as desired, although it is usually preferred to use a molar excess of the end capper to insure complete end capping of all primary amino end groups of the polymer. For example, the end capper can be used in amounts ranging from about 5 to about 2,000 moles, preferably about 110 to about 1,900 moles, per mole of polymer can be used. No solvent is needed in most cases although, if desired, suitable solvents such as dioxane, dimethyl formamide, and the like may be used. Temperatures can range from about 50 or lower to about 150° C. or higher. The time of reaction is not narrowly critical and can extend from 1 hour to 50 hours for example. The end capper and polymer can be brought together in any desired manner, e.g., the polymer or solution of same can be incrementally added to the end capper or vice versa or the two may be mixed together all at once. The end capped polymer is readily isolated as by distillation, coagulation in a non-solvent such as methanol, or other suitable means.

The conditions of copolymerizing or co-reacting the alpha-amino acid polymer and the silicon compound also are not narrowly critical. It is usually preferable to bring about copolymerization or co-reaction in a mutual solvent, such as, dioxane, dimethyl formamide, dichlorobenzene, chlorobenzene and the like. The molar proportions used are consistent with the desired type of copolymer or product desired. For example, if it is desired to obtain an $(AB)_n$ copolymer, substantially equal molar proportions of difunctional polymer and difunctional siloxane are used. If it is desired to obtain an ABA copolymer, two moles of monofunctional polymer per mole of difunctional siloxane are used and if it is desired to obtain an BAB copolymer two moles of monofunctional or difunctional siloxane per mole of difunctional polymer are employed. The temperature of copolymerization or co-reaction also is not narrowly critical and can be in the range of about 100° C. to about 200 C., preferably about 130° C. to about 180° C. It is usually convenient to carry out the copolymerization or co-reaction by refluxing the polymer and silicon compound in a suitable solvent. The time required for the copolymerization can range from one to six hours. The course of the reaction can be followed by end group analysis, the evolution of by-products of the copolymerization or co-reaction or by any other means to determine completion.

The block copolymers of this invention constitute a class of synthetic macromolecules having unique characteristics useful in the development of blood compatible polymers, for example, as materials for cardiovascular implantation. Since block copolymers in general are composed of extended homopolymer segments of each comonomer, the properties of block copolymers are composites of the properties of the component species, rather than averages of these properties as in the case of random copolymers. In view of the obvious necessity that a material for use in circulatory assist devices display adequate mechanical performance properties as well as improved blood compatibility, this feature of block copolymers, as possessed by block copolymers of this invention, is highly advantageous. Polymers such as synthetic alpha-amino acid polymers, which are models for naturally occurring macromolecules, might be expected to partially duplicate the surface properties of the normal vessel wall. At the same time, however, the physical and mechanical properties of such polymers do not make them particularly attractive as materials for use in the fabrication of heart assist devices. The block copolymers of this invention have useful mechanical properties and largely retain the protein-like chemical properties and surface activity of the alpha-amino acid polymers.

The block copolymers of this invention represent an extremely versatile polymer system which permits extensive variability in physical and chemical properties through the selection of appropriate combinations of components. The alpha-amino acid polymer segments can be prepared from virtually any neutral, acidic, or basic amino acid, and can be random copolymers or terpolymers synthesized from appropriate combinations of alpha-amino acids. This provides considerable scope in chemical properties, as well as affording access to an extended range of hydrophilic and hydrophobic polymers. In like fashion, the second major component, the siloxane, of the block copolymers can be selected from among a multiplicity of candidates representing a broad spectrum of desirable physical and chemical characteristics. In those novel block copolymers in which the alpha-amino acid polymer component is poly(gamma-benzyl L-glutamate) or a corresponding ester hydrolysis product and the second component is the polysiloxane, partial or total ester hydrolysis makes possible the preparation of chemically related species of varying hydrophilic character, which greatly facilitates evaluation of the influence of relative hydrophilicities on blood compatibility. The alpha-amino acid polymer portion of such block copolymers can exist in the solid states as a highly helical polypeptide, and can also be readily converted to the random coil (beta-form) when cast as a film from an appropriate solvent, such as dichloroacetic acid or formic acid. The polysiloxane portion of such block copolymers offers advantages, since polysiloxanes have already been used widely as surgical materials and their physiological activity is well documented.

The compositions of this invention containing silicon-bonded alkenyl groups can be polymerized or cured via such groups using known processes (e.g., heat and free radical catalysts). By way of illustration a thermoplastic block copolymer as above defined wherein from 0.1 to 3.0 mole percent of the silicon-bonded monovalent hydrocarbon groups [R′ in Formula 5] are alkenyl groups can be cured by heating at a temperature from 100° C. to 300° C. in the presence of a catalytic amount (from 0.1 to 5.0 weight percent based on the weight of the block copolymer) of a peroxide catalyst (e.g., an aryl peroxide such as benzoyl peroxide or an alkyl peroxide such as ditertiary butyl peroxide) to produce a thermoset product. Such thermoset products are useful as coating resins or elastomers.

The block copolymers of this invention can contain other groups and blocks in addition to those specifically set out hereinabove. Thus the siloxane block can contain any of a wide variety of other well known siloxane groups (e.g., nitroarylsiloxane, haloalkylsiloxane, fluoroalkyl siloxane, cyanoalkylsiloxane, and carbalkoxyalkylsiloxane groups and the like) as well as silicate groups. Simiarly small amounts of other amino acids or lactams (e.g., epsilon-amino-caproic acid, delta-amino-heptanoic acid, and caprolactam) can be used in producing the polyamide blocks. Further, other amorphous blocks can be present in the block copolymers in addition to the siloxane blocks (e.g., polylactone blocks, poly(oxyalkylene blocks), or polyester blocks.

As is apparent to one skilled in the art, the blocks in the compositions of this invention are normally end-blocked, the possibility of cyclic structures being remote. Such endblockers are inconsequential in terms of their amount and effect on the properties and utilities of the compositions. Normally such endblockers will be residual reactive groups of the polyamide and/or siloxane reactant used to produce the composition. At times, however, it may be desirable to "cap" the blocks by converting such reactive groups to less reactive groups by known methods. Where catalysts are used in the production of the compositions, the blocks may be endblocked by catalyst residues. Endblocking by impurities is also a possibility.

The compositions of this invention can be discrete chemical compounds or block copolymers. Usually, however, they are mixtures of various discrete compounds of copolymers due in part to the fact that the polymeric reactants used to produce the compositions of this invention are themselves usually mixtures.

The compositions of this invention are useful in a variety of areas wherein their desirable properties can be used to advantage. Thus the silanes of this invention can be used as sizes for fibrous glass, RTV compositions and protective coatings for metals. The thermoplastic block copolymers of this invention are generally useful as molding and extruding resins. Thermoplastic and elastomeric block copolymers of this invention are useful as fibers, packaging films, thermal insulation, blood compatible polymers, biomedical devices, and semi-permeable membranes, such as, partition membranes for the dialysis of blood. The thermoplastic and rigid block copolymers of this invention are useful as protective coatings. The thermosetting block copolymers of this invention are useful as protective coatings and encapsulating resins.

The compositions of this invention possess desirable properties which make them especially useful in the above areas of application. By way of illustration, the compositions, even those wherein the polyamide block is linked to silicon by an oxygen atom, are hydrolytically stable. The compositions are remarkably stable to oxidation, ultraviolet light and heat. The block copolymers are useful over a wide temperature range. The solid block copolymers do not require annealing to achieve good physical properties although they may be annealed, if desired, to further improve their properties. The solid thermoplastic block copolymers do not require curing or vulcanization to be useful as elastomers or rigid resins.

The phrase "molecular weight" is used herein to denote number average molecular weight.

The following examples illustrate the present invention.

In the examples appearing below, all parts and percentages are on a weight basis, all temperatures are on the centigrade scale, RV designates reduced viscosity, M.W. designates molecular weight, and the values of the integers $k$, $m$, $n$ and $y$ in the formulas correspond to the molecular weight given for the polymer or copolymer designated by each formula.

In the examples, the benzyl L-glutamate was prepared by reacting L-glutamic acid with benzyl alcohol, present in large excess to also function as solvent, and in the presence of hydrobromic acid (48% based on the total weight of the total reaction solution). The NCA of benzyl L-glutamate was prepared by passing phosgene through a solution of benzyl L-glutamate in dioxane according to Blout & Karlson, supra.

The molecular weights of the alpha-amino acid polymers given in the examples were determined by amino end group analysis using the procedure of titrating nitrobenzene solutions of the polymer with perchloric acid in purified dioxane, using a constant rate burette, while continuously measuring potentiometrically the pH change using a titrimeter recorder combination. The amino end group content is calculated from which the molecular weight is determined. The procedure is rapid and provides results that are reproducible to within about ±1%. In those cases of polymers formed with aminophenol initiators, the phenolic hydroxyl end group content of the polymers can be readily determined by potentiometric titration with tetra-t-butyl ammonium hydroxide.

The reduced viscosities (RV) of the block copolymers of the following examples were measured by the following technique: Reduced viscosity (RV) is determined by dissolving a 0.2 gram sample of the block copolymer in chlorobenzene in a 100 milliliter volumetric flask so that the volume of the resultant solution is exactly 100 milliliters. The viscosity of the solution, after filtration through a sintered glass funnel, is determined in Cannon-Fenske viscometer at 25° C. Reduced viscosity values are obtained from the equation:

$$\text{Reduced Viscosity} = \frac{t_s - t_o}{(c) \times (t_o)}$$

wherein $t_o$ is the efflux time of the pure chloroform
$t_s$ is the efflux time of the block copolymer solution
$c$ is the concentration of the block copolymer solution expressed in terms of grams of block copolymer per 100 ml. of solution.

EXAMPLE 1

(A) Poly(gamma-benzyl L-glutamate) (PBLG)

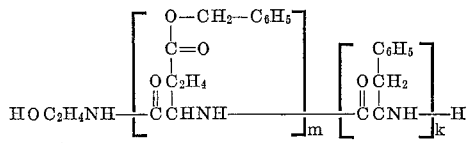

To a solution of N-carboxy-gamma-benzyl-L-glutamate anhydride (NCBLGA)

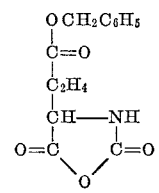

(52.1 g., 0.198 mole) in 500 ml. of purified dimethyl formamide were added 7.94 ml. of a 1 M solution of ethanolamine initiator (about 0.0079 mole) in dimethylformamide. The molar ratio of NCBLGA to initiator was about 25. The progress of the polymerization was followed by analysis of the unreacted NCA. When the conversion reached ≥90%, 0.016 mole of N-carboxy-phenylalanine anhydride was added so that the end group of the PBLG is derived from phenylalanine. This end capping is desirable because the amino group in PBLG is capable of cyclizing with the gamma-carbobenzoxy group to the pyrrolidone ring, which destroys one of the functionalities. The polymer PBLG was isolated by coagulation in water and was washed with methanol to give 50 g. of polymer. The number average molecular weight as determined by potentiometric titration of the amine groups was 7600.

(B) PBLG end capped with caprolactone

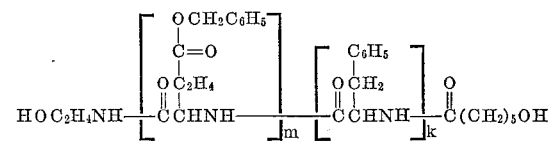

A mixture of 38 g. of the PBLG prepared in (A) above and 100 ml. of epsilon-caprolactone was stirred and heated on a steam bath. A clear solution was formed in about 1 hour and heating was continued for 50 hours. The polymer was isolated by coagulation and was washed with methanol to give 38 g. of the polymer. Analysis of the residual amino group indicated that 94% of its amino function had been converted.

(C) Block copolymer of end capped PBLG and poly(dimethyl siloxane)

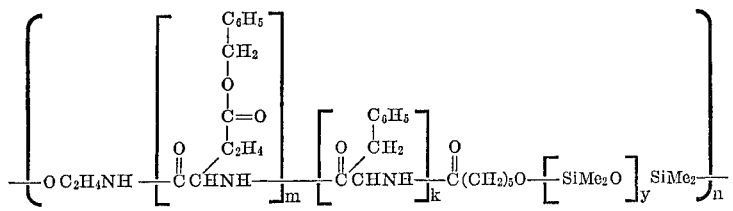

The end capped PBG prepared in (B) above (14.195 g., 1.7×10⁻³ mole) in 40 ml. of o-dichlorobenzene and 20 ml. of benzene was stirred and heated under nitrogen atmosphere. The condenser was arranged for downward distillation and after 20–25 ml. of distillate was collected, the reaction mixture reached 175°. The condenser was then rearranged for refluxing. Alpha, omega-bis(dimethyl-amino-poly(dimethylsiloxane), (9.18 g., 1.7×10⁻³ mole), Me₂N(SiMe₂O)$_y$SiNMe₂, in 5 ml. of o-dichlorobenzene was added dropwise over 1 hour. The reaction mixture was further heated at 170–180° for 2 hours and at the end of this time, the dimethyl amine evolution was complete. The polymer was isolated by coagulation in methanol and washed by decantation with hexane. There was obtained 7.8 g. of the block copolymer. A film, compression molded therefrom, had a tensile strength 160 p.s.i., a tensile modulus 7260 p.s.i. and an elongation of 6% (at room temperature).

EXAMPLES 2–11

The procedure of Example 1(A) was repeated using the initiators listed in Table 3 below and the molar ratios of NCBLGA monomer per mole of initiator listed in the table. In Examples 2 through 10, the resulting PBLG had the formula:

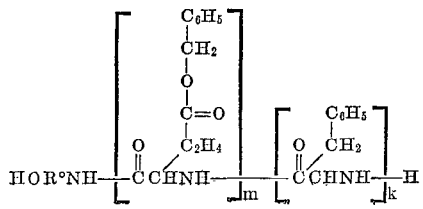

wherein R° is a divalent group as listed in Table 3. In Example 11, the resulting PBLG had the formula:

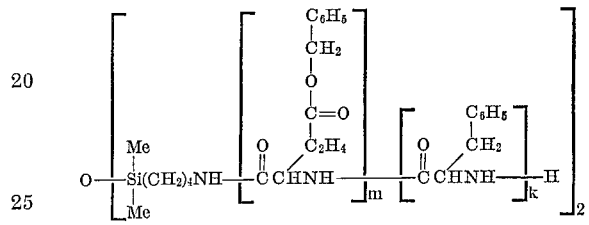

The molecular weights of the resulting PBLG's are listed in Table 3.

TABLE 3

| Example | Initiator | Moles monomer per mole initiator | —R°— | M.W. |
|---|---|---|---|---|
| 2 | p-Aminophenol | 50 | —C₆H₄— | ¹ 23,000 |
| 3 | do | 24 | Same | ² 8,600 |
| 4 | do | 25 | do | ² 8,900 |
| 5 | do | 75 | do | ³ 24,000 |
| 6 | m-Aminophenol | 25 | do | ³ 19,000 |
| 7 | do | 20 | do | ³ 21,000 |
| 8 | do | 35 | do | ³ 19,600 |
| 9 | do | 100 | do | ³ 78,000 |
| 10 | Ethanolamine | 50 | C₂H₄ | ³ 16,000 |
| 11 | [NH₂(CH₂)₄Si(CH₃)₂—]₂O | 50 | | ³ ⁴ 5,200 |

¹ Estimated from viscosity data.
² Determined by analysis of OH group.
³ Determined by analysis of NH₂ group.
⁴ Equivalent weight.

EXAMPLE 12

PBLG end capped with hydroxybenzoic acid

A solution of 15 g. (6.9×10⁻⁴ mole) of PBLG (prepared by m-aminophenol initiator as in Example 7) and 0.14 g. (1.02×10⁻³ mole) of p-hydroxybenzoic acid in 50 ml. of xylene was stirred and heated to reflux. Water formed was azeotropically removed from the mixture by means of a Dean-Stark tube. The reaction mixture was maintained at reflux for 18 hours and then 25 ml. of the solvent was removed by distillation. The polymer was recovered by coagulation in methanol to yield 12.4 g. of the polymer. Analysis of the amino end group showed that about 80% of the amino functionality had been converted thus resulting in an end capped polymer of the formula:

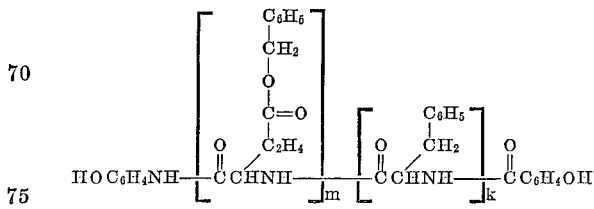

EXAMPLE 13

ABA block copolymer

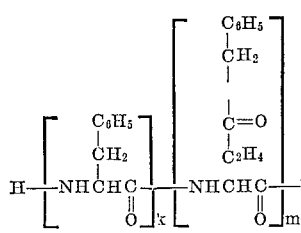 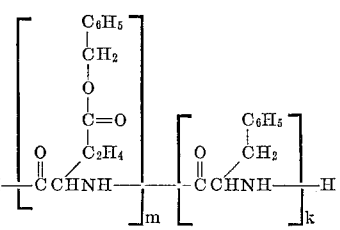

PBLG prepared in a manner similar to that used in Example 9 and having an M.W. 77,500 (5.712 g., 7.36×10⁻⁵ mole) was heated in 50 ml. of chlorobenzene under nitrogen atmosphere until a solution was formed. Approximately 20 ml. of the chlorobenzene used was distilled to azeotropically remove traces of any water that might have been present. A solution of alpha,omega-bis (dimethylamino)poly(dimethyl siloxane), M.W. 20,900 (0.82 g., 3.68×10⁻⁵ mole), in 5 ml. of chlorobenzene was added dropwise over 1 hour. The reaction mixture was stirred at reflux under a nitrogen atmosphere until the evolution of amine was complete which required about 3 hours. The block copolymer, 5.3 g., was isolated by coagulation in methanol. A film was molded at 170–180°.

In a similar manner, ABA type block copolymer was also prepared from PBLG (M.W. 19,500) prepared in a manner similar to that used in Example 8 and poly(dimethyl siloxane) (M.W. 20,900). Film of this block copolymer was cast from chlorobenzene.

EXAMPLES 14–16

In a manner similar to that described in Example 1(A) and (B), PBLG end capped with epsilon-caprolactone was prepared with a molecular weight of 7140 and having end groups of the formulas $$-\overset{O}{\overset{\|}{C}}(CH_2)_5OH$$

and HOC₂H₄NH—, as shown by the formula of Example 1(B). This PBLG was reacted with alpha,omega-bis(dimethylamino)poly(dimethyl siloxane) of three different molecular weights as shown in Table 4 using the procedure described in Example 1(C) using, however, the solvent and temperature set forth in Table 4. There resulted (AB)ₙ block copolymers having the formula shown in Example 1(C) and the RV's given in Table 4. These copolymers were readily cast from the designated solvents to form useful films.

TABLE 4

| | Siloxane, m.w. | Solvent | Temperature | RV of block copolymer |
|---|---|---|---|---|
| Example: | | | | |
| 14 | 11,500 | O—C₆H₄Cl₂ | 180° | 0.35 |
| 15 | 20,900 | Same | 180° | 0.23 |
| 16 | 20,900 | ClC₆H₅ | 130° | 0.43 |

EXAMPLES 17 THROUGH 22

In a manner similar to that described in Example 1(A), PBLG's were prepared with a molecular weight of 7600 (Examples 17 through 20) and by using lesser amounts of initiator a PBLG of 7800 M.W. (Example 21) and a PBLG of 8600 M.W. (Example 22) were prepared. Each of these polymers was end capped, following the procedure of Example 1(B), with different amounts of epsilon-caprolactone under different conditions (larger amounts of lactone and longer reaction times result in higher levels of difunctionality) to result in the percent difunctionality presented in Table 5 below as determined from the primary amino content. The PBLG's were then copolymerized with equal molar amounts of the alpha, omega-bis-(dimethylamino)poly(dimethyl siloxane), 5400 M.W., in the manner described in Example 1(C), however, under the conditions set forth in Table 5. The resulting block copolymers had the formula shown in Example 1(C) and the RV's listed in Table 5. A film, compression molded from the block copolymer of Example 18 had a tensile strength of 166 p.s.i., a tensile modulus of 7350 p.s.i. and an elongation at break of 6% (room temperature).

TABLE 5

| | PBLG | | Copolymerization conditions | | | Reduced viscosity of block copolymer [1] |
|---|---|---|---|---|---|---|
| | Percent difunctional | Molecular weight | Solvent | °C. | Time, hours | |
| Example: | | | | | | |
| 17 | 94 | 7,600 | o-C₆H₄Cl₂ | 180 | 3 | 0.14 |
| 18 | 91 | 7,600 | o-C₆H₄Cl₂ | 180 | 3 | 0.17 |
| 19 | 80 | 7,600 | C₆H₅Cl [2] | 180 | 3 | 0.13 |
| 20 | 75 | 7,600 | o-C₆H₅Cl₂ | 180 | 16 | 0.13 |
| 21 | 91 | 7,800 | DMF [3] | 120 | 16 | 0.10 |
| 22 | 85 | 8,600 | Dioxane | 101 | 3 | |

[1] In chloroacetic acid in place of chlorobenzene.
[2] Plus CF₃COOH as catalyst.
[3] Dimethyl formamide.

What is claimed is:

1. An alpha-amino acid polyamide-substituted organosilicon block copolymer comprising about 1 to 99 mole percent of polyamide blocks of the formula:

$$\left[ -\overset{O}{\overset{\|}{C}}\overset{R}{\overset{|}{C}}HNH- \right]_m$$

wherein R is selected from the class consisting of hydrogen and monovalent organic groups and m is an integer of at least 2, and from 1 to 99 mole percent of siloxane blocks comprising at least two groups having the formula:

$$Z_bSiO_{\frac{4-b}{2}}$$

wherein Z is selected from the class consisting of a monovalent hydrocarbon group and divalent groups L and L', each siloxane block having at least one such divalent group represented by Z connecting said siloxane block with said polyamide block, L is selected from the class consisting of —HNR°O— and —HNR°— wherein R° is a divalent hydrocarbon group having 1 to 18 carbon atoms and wherein the nitrogen bond thereof is connected to a terminal carbonyl of said polyamide block and the other bond thereof is connected to silicon of said siloxane block, L' is selected from the class consisting of —COR°O—, —R°O—, —COR°OR°— and —R°OR°— wherein the carbonyl and R° groups thereof are bonded to a terminal nitrogen of said polyamide block and the other bond thereof is connected to silicon of said siloxane block, and b is an integer of 2 to 3 inclusive.

2. A composition as defined in claim 1 wherein R is selected from the class consisting of

C₆H₅CH₂OCOC₂H₄— and $C_6H_5CH_2-$ groups, L is $-HNR°-$ and L' is $-COR°O-$.

3. A thermoplastic block copolymer comprising (A) from 5 to 95 mole percent of at least two polyamide blocks having the formula:

wherein R and $m$ are as defined in claim 1, said polyamide blocks each having a molecular weight from 2,000 to 100,000; and (B) from 5 to 95 mole percent of at least one siloxane block represented by the formula:

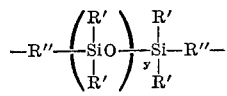

wherein R' is a monovalent hydrocarbon group, R'' is a divalent group selected from the class consisting of L and L' as defined in claim 1 and $y$ is a positive number, each siloxane block having an average molecular weight from 500 to 100,000.

4. A thermoplastic block copolymer as claimed in claim 3 having the formula:

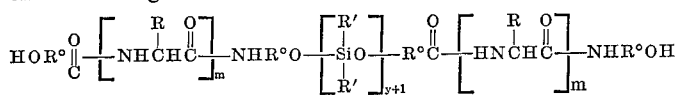

wherein R, R', R°, $m$ and $y$ are as defined in claim 3.

5. A thermoplastic block copolymer as claimed in claim 3 having the formula:

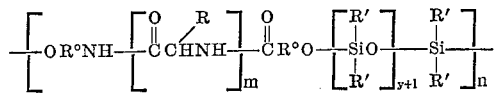

wherein R, R', R°, $m$ and $y$ are as defined in claim 3 and $n$ is an integer.

6. A thermoplastic and elastomeric block copolymer as defined in claim 3 wherein the block copolymer has a tensile modulus from 100 to 10,000 pounds per square inch, the polyamide blocks constitute from 5 to 50 mole percent of the block copolymer and the siloxane blocks constitute from 50 to 95 mole percent of the copolymer.

7. Block copolymer as claimed in claim 3 having the formula:

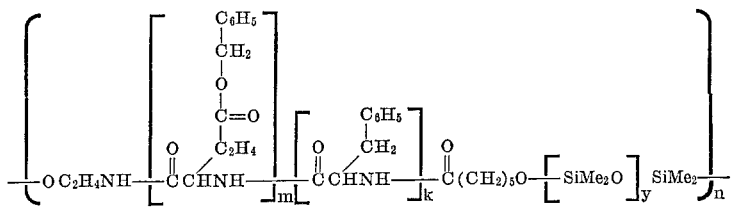

wherein $m$ is as defined in claim 5 and $k$ and $n$ are integers.

8. Organosilicon composition as claimed in claim 3 having the formula:

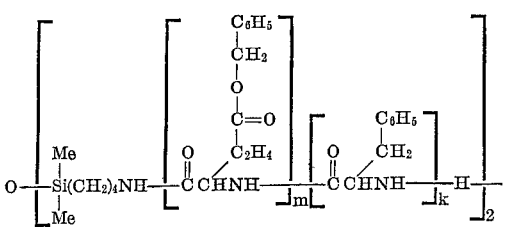

wherein $m$ is as defined in claim 3 and $k$ is an integer.

9. Block copolymer as claimed in claim 4 having the formula:

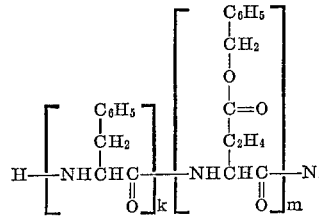

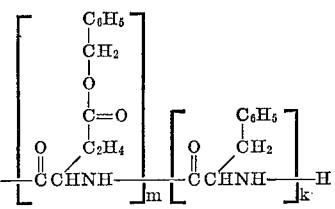

wherein $m$ is as defined in claim 3 and $k$ is an integer.

References Cited

UNITED STATES PATENTS

| | | | |
|---|---|---|---|
| 3,284,156 | 11/1966 | Magat et al. | 260—824 |
| 3,384,599 | 5/1968 | Omietanski et al. | 260—824 |
| 3,457,323 | 7/1969 | Stengle | 260—824 |

SAMUEL H. BLECH, Primary Examiner

U.S. Cl. X.R.

3—1; 117—126, 132, 161; 260—30.4, 32.6, 33.8, 46.5, 47, 77.5, 78, 307, 534, 84; 264—346